United States Patent Office 3,153,672
Patented Oct. 20, 1964

3,153,672
ALKANONE THIOETHERS
Walter Reifschneider, Midland, Mich., assignor to The
Dow Chemical Company, Midland, Mich., a corporation of Delaware
No Drawing. Filed June 27, 1962, Ser. No. 205,515
3 Claims. (Cl. 260—590)

The present invention is directed to thioethers and in particular is directed to novel thioethers corresponding to the formula

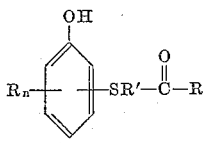

In the present specification and claims, each R independently represents a lower alkyl group, and $n$ is an integer from 0 to 4, inclusive. In the present specification and claims, lower alkyl is defined as an alkyl group being of from 1 to 5, inclusive, carbon atoms.

R' represents a loweralkylene group. Loweralkylene is defined as an alkylene group being of from 1 to 5, inclusive, carbon atoms.

The novel compounds are viscous liquids which can usually be crystallized to obtain colorless crystalline solids appearing white in mass, as low solubility in water but readily soluble in various common organic solvents such as lower alkanols, benzene and the like. The compounds are useful as insecticides and arachnicides: they are of value as active agents for the control of internal parasites of warm-blooded animals. They are useful to control rough fish. They are further useful as intermediates in the preparation of biologically active phosphate materials.

The compounds are prepared by a process which comprises the steps of causing a reaction between a suitable mercaptan or mercaptide compound and a suitable halide compound. Typically the compounds are prepared by a reaction between a phenolic compound corresponding to the formula

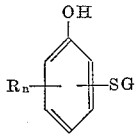

wherein G represents hydrogen, alkali metal, or cuprous copper, and a haloalkanone corresponding to the formula

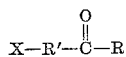

wherein X represents halogen. During the reaction to prepare the present compounds, one molecule of phenolic mercaptan reacts with each molecule of haloalkanone. Thus, when it is desired to prepare the present compound in a high state of purity and with a minimum of necessary post-synthesis purification procedure, the starting reactants should be employed in approximately equimolecular proportions. However, other proportions may be employed if desired, and unconsumed starting material of whatever identity may, if desired, be recycled into further synthesis process, so long as the halide is not in excess. Such excess tends to produce undesired compounds.

The reaction goes forward at temperatures over a wide range, such as from 30° to about 275° C., but initiates most readily when heated to a temperature somewhat higher than room temperature; a preferred temperature is from 40° to 100° C. Under these conditions the reaction is, in general, exothermic and goes forward to completion with good yield calculated upon the basis of consumed starting material. When employing mercaptan, hydrogen halide of reaction is evolved.

Typically, in the preparation of the compounds of the present invention, reaction between the phenolic starting material and the haloalkanone starting material will initiate and go forward when there is employed a strong hydrogen halide acceptor such as an alkali metal hydroxide. Such material may function to form a fugitive alkali metal salt of the mercapto group. Also, the reaction goes forward when there is employed as catalytic agent, simultaneously, a catalytic amount of both a source of cuprous ion and a nitrogenous base. The exact weight is not critical. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salts may be employed. The employed amount is not critical, but may vary from a very small trace amount, less than $\frac{1}{100}$ of 1 mole percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogeneous base may be a naturally liquid substance which is employed as a reaction medium. Otherwise, such base is dissolved in inert liquid reaction medium such as an aliphatic or aromatic hydrocarbon. When employing alkali metal hydrogen halide acceptor, a lower alkanol is a satisfactory solvent.

In carrying out the reaction to prepare a compound of the present invention, the mercaptophenol and the haloalkanone are intimately mixed and blended, in any order and in desired amounts, with halide acceptor source or cuprous ion and nitrogenous base as hereinbefore described, and thereafter heated, to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired product of the present invention is separated in manners which, in view of the teaching of the instant specification will be evident to skilled chemists. In one such manner, the reaction mixture, hot from heating to the reaction temperature, is filtered to remove alkali metal halide; the filtrate is vacuum dried, the resulting residue dissolved in 10 percent aqueous sodium hydroxide and the resulting solution quenched in ice and hydrochloric acid. The desired product separates in an organic phase in the resulting two-phase solution. This phase is separated, distilled in vacuum or crystallized from solvent such as methylcyclohexane.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

EXAMPLE I

*(4-Hydroxy-2,6-Xylylthio)-2-Propanone*

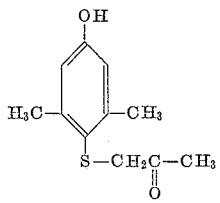

A reaction mixture is prepared, consisting of 15.4 grams (0.1 mole) of 4-mercapto-3,5-xylenol and 4.0 grams of sodium hydroxide dissolved in 50 milliliters methanol. To this, there is added, dropwise and with vigorous stirring, 9.3 grams (0.1 mole) of chloro-2-propanone. The resulting reaction mixture is placed in a flask under reflux, and heated at its reflux temperature (a pot temperature between approximately 50° and 75° C.) for 2 hours to carry the reaction to completion. At the end of this reaction period, the resulting hot mixture is filtered; the sodium chloride residue is discarded. The filtrate is warmed to vaporize and remove solvent and obtain a residual oil. This oil is dissolved in 50 milliliters 10 percent aqueous sodium hydroxide: the resulting solution is washed with ether and poured into ice and 15 milliliters concentrated hydrochloric acid. An oily phase which separates is recovered, taken up in and crystallized from methylcyclohexane. As a result of these procedures there is obtained a (4-hydroxy-2,6-xylylthio)-2-propanone product as a white crystalline solid. The compound has a molecular weight of 210.3.

The compound of the present example is useful as a parasiticide and insecticide. A group of laboratory mice heavily infested, were completely freed of tapeworms and pinworms and almost completely freed of pig ascarids, when fed for 7 days on a balanced laboratory diet containing 2500 parts of the present compound per million parts of resulting medicated diet.

In the control of rough fish, the median lethal dose is one part of the present compound dispersed in one million parts of water, for carp inhabiting the so-treated water.

The pure compound melts at 120°–121.5° C.

The foregoing procedures are adapted to prepare all the products of the present invention: however the purification procedures are of secondary importance since the unpurified products are as active as the pure, upon the basis of product compound content.

From 2-mercapto-3,5-xylenol and 5-chloro-2-pentanone there is prepared a 5-(6-hydroxy-2,4-xylylthio)-2-pentanone.

From 1-bromo-6-undecanone and p-mercaptophenol there is prepared a 1-(p-hydroxyphenylthio)-6-undecanone.

From 2-mercapto-6-tert-pentylphenol and chloro-2-propanone there is obtained a (2-hydroxy-3-tert-pentylphenylthio)-2-propanone.

From 4-mercapto-2,3,5,6,-tetramethylphenol and 7-bromo-4-methyl-3-heptanone there is obtained a 7-(4-hydroxy-2,3,5,6-tetramethylphenylthio)-4-methyl-3-heptanone.

From 4-tert-butyl-2-mercaptophenol and 2-chloro-3-pentanone, there is obtained a 2-(5-tert-butyl-2-hydroxyphenylthio)-3-pentanone.

Many of the haloloweralkanones used herein as starting materials are articles of commerce. All can readily be synthesized in known procedures. One such method is set forth in U.S. Patent 2,397,134. Another is found in Berichte der deutschen chemischen Gesellschaft, 22, 1196, the method of Lipp. See especially page 1206 and following. This method is applicable to starting materials homologous with those employed by Lipp, to obtain homologous products.

The mercaptophenols are readily prepared by cleaving a thioether which has a thioaliphatic group etherifying the site upon which the mercapto group is to appear. The cleavage is readily carried out in two steps: first, dissolving the thioether compound in liquid ammonia together with excess sodium of which the excess is indicated by the blue color of sodium dissolved in ammonia: thereafter, neutralizing excess sodium with ammonium chloride, drying, and second, reacting the resulting intermediate with a mineral acid in water. The resulting products can then be separated by solvent extraction and distillation.

The aromatic-aliphatic thioether phenols are readily prepared by reacting a halophenol with excess of an alkali metal mercaptide. At the site of aromatic halogen there attaches the thioalkyl group of the mercaptide with release of alkali metal halide salt. This reaction goes forward readily in inert solvent such as a hydrocarbon oil, alkanol, or the like, at temperatures of about 150° C.

I claim:

1. A compound of the formula

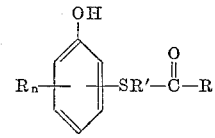

wherein each occurrence of R is independently a lower alkyl group and R' is a lower alkylene group, and $n$ is an integer from 0 to 4, inclusive.

2. (4-hydroxy-2,6-xylylthio)-2-propanone.
3. 5-(6-hydroxy-2,4-xylylthio)-2-pentanone.

References Cited in the file of this patent

UNITED STATES PATENTS

| | | |
|---|---|---|
| 2,010,828 | Rothrock | Aug. 13, 1935 |
| 2,965,535 | Birum | Dec. 20, 1960 |